July 6, 1937.    M. BONOTTO    2,086,181
APPARATUS FOR TREATMENT OF SOYA BEANS AND OTHER MATERIAL
Filed July 15, 1935    2 Sheets-Sheet 1
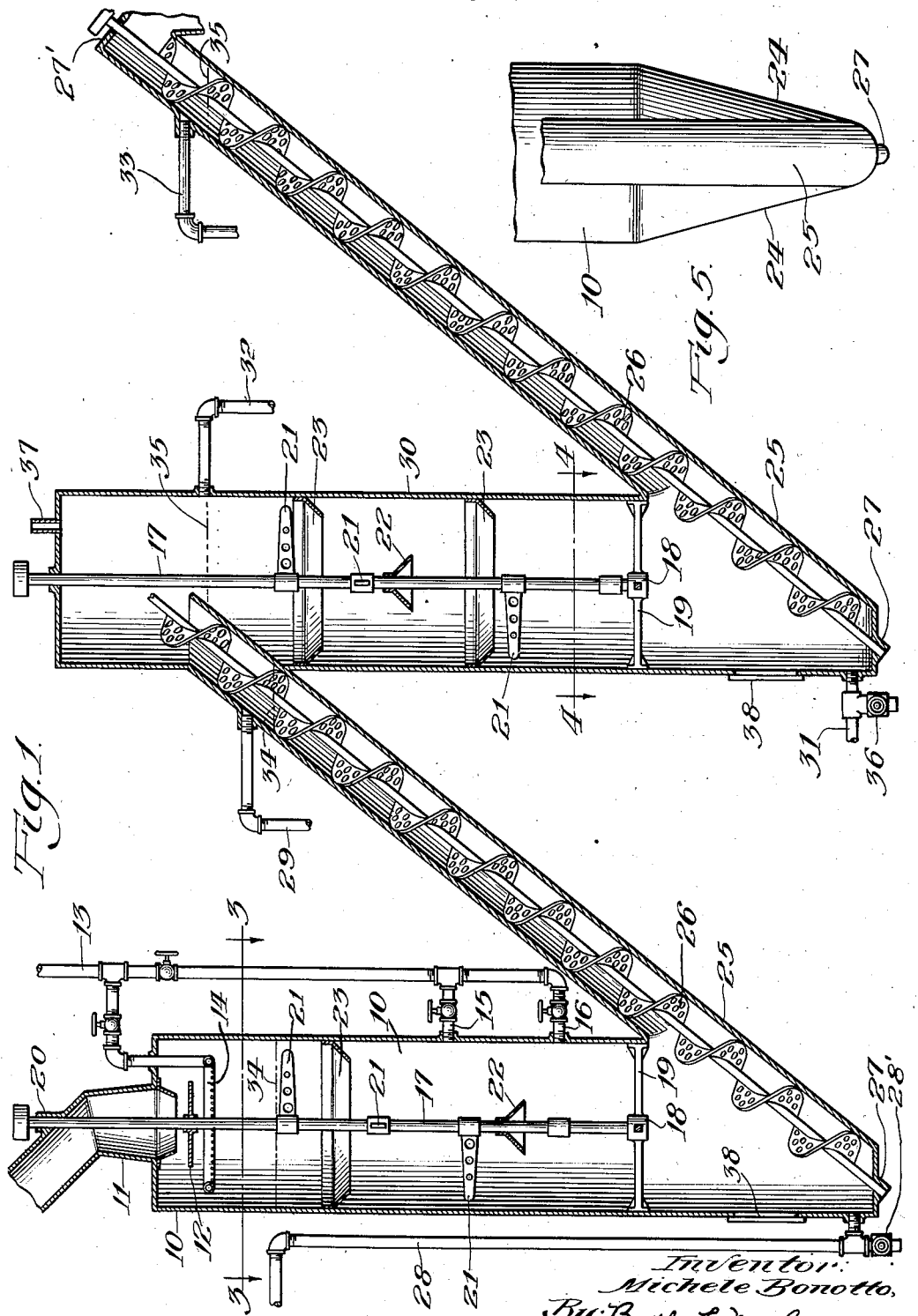

July 6, 1937.                    M. BONOTTO                        2,086,181
              APPARATUS FOR TREATMENT OF SOYA BEANS AND OTHER MATERIAL
                        Filed July 15, 1935          2 Sheets-Sheet 2
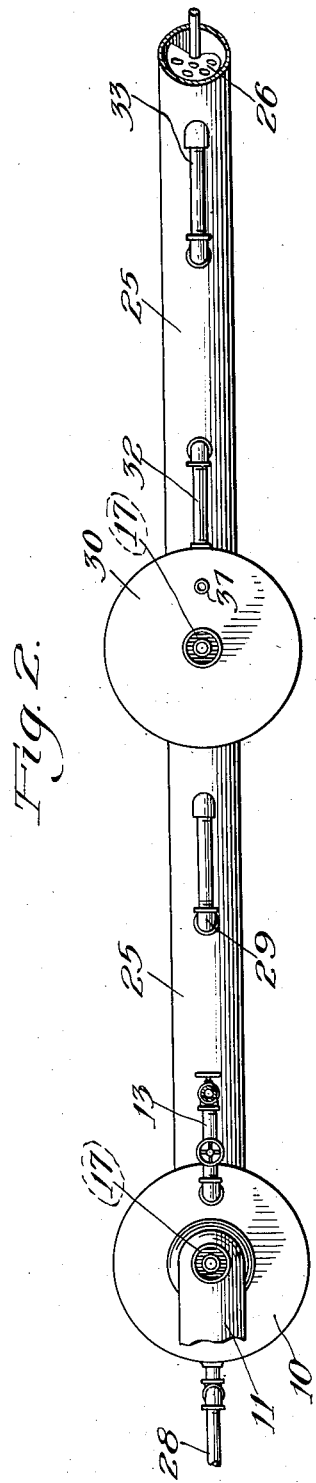
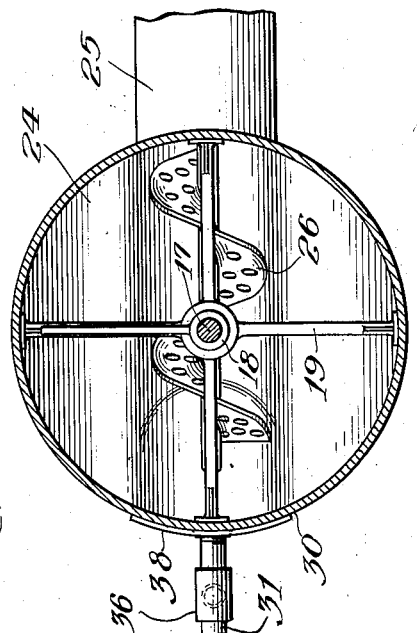
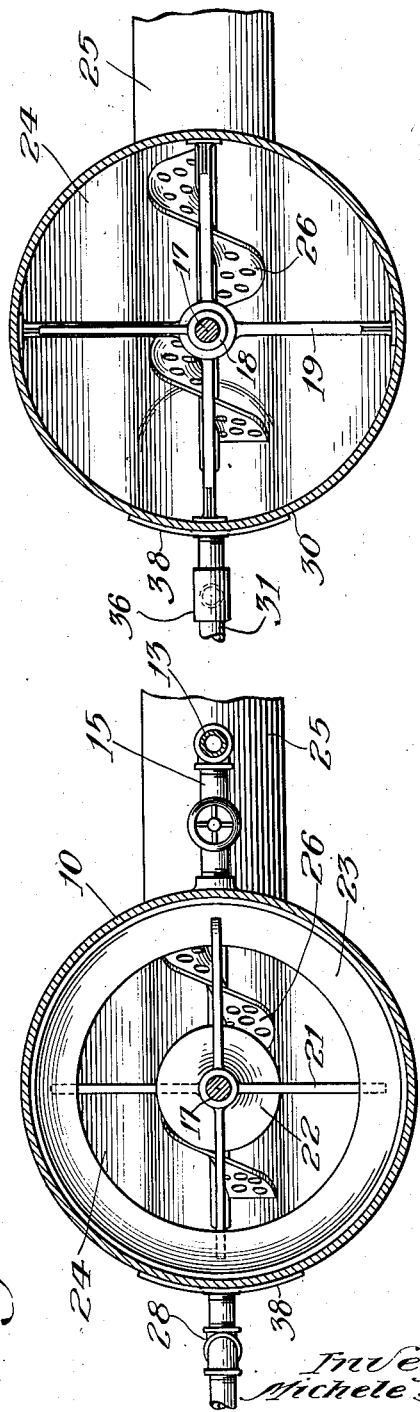

Patented July 6, 1937

2,086,181

UNITED STATES PATENT OFFICE 2,086,181

APPARATUS FOR TREATMENT OF SOYA BEANS AND OTHER MATERIAL

Michele Bonotto, Evansville, Ind., assignor, by mesne assignments, to American Soya Products Corporation, Evansville, Ind., a corporation of Indiana Application July 15, 1935, Serial No. 31,542

3 Claims. (Cl. 99—237)

This invention relates to apparatus for treating material such as soya beans and the like and is particularly adapted for the treatment of material by a continuous operation as distinguished from batch treatment. For example, the acrid taste and odor may be removed from soya beans by soaking the beans in an $SO_2$ solution and subsequently washing the beans, and one of the objects of my invention is to provide apparatus for subjecting soya beans to such soaking and washing treatments in a continuous operation. Obviously, the apparatus may be used or adapted for use for the treatment of materials other than soya beans, and it should be understood that the invention is not limited to the form of construction chosen for the embodiment shown in the drawings.

The advantages of the apparatus of my invention will be apparent from the following specification.

In the drawings:

Fig. 1 is a vertical sectional view of apparatus embodying my invention.

Fig. 2 is a plan view of the same.

Fig. 3 is an enlarged horizontal sectional view taken on the line 3—3 of Fig. 1, looking downwardly.

Fig. 4 is an enlarged horizontal sectional view taken on the line 4—4 of Fig. 1, looking downwardly.

Fig. 5 is a side elevation of the lower portion of either one of the two container and conveyor units shown in Fig. 1.

In that embodiment of my invention shown in the drawings, the cylindrical container 10 is adapted to receive the material to be treated through the supply spout 11 at the top of the container. A distributor is indicated at 12. If soya beans are to be treated, an aqueous solution of $SO_2$ or other suitable agent may be supplied through the conduit 13 and spray 14. The conduit 13 extends downwardly and is connected with the container by valved inlets 15 and 16 to provide the lower part of the container 10 if required with the particular agent being used for the treatment of the material in the container. The shaft 17 is rotatably mounted at its lower end in a bearing 18 in the cross piece 19 at the lower end of the cylinder 10 and said shaft 17 is mounted at its upper end in a bearing 20 formed in the supply spout 11. The shaft 17 preferably carries a plurality of agitator blades 21 and one or more baffles 22. An annular baffle 23 is provided on the inner surface of the cylinder wall 10. Additional baffles 23 may be provided.

The container 10 preferably is circular in cross section in its upper, major portion, and inclined inwardly at opposite sides in its lower portion, as indicated in Fig. 5 at 24, the inclined walls merging into the tubular wall 25 enclosing the conveyor 26 rotatably mounted in the bottom 27 of the housing. The conveyor 26 is perforated, as shown; the size of the perforations being determined according to the material to be conveyed. The upper end of the conveyor 26 may be journalled in a suitable manner and driven from any desired source of power. Overflow conduits 28 and 29 are provided for the container 10 and conveyor housing 25, respectively. A drain 28' is provided at the lower end of the conduit 28.

The second container, indicated at 30, is substantially identical with the container 10, and is provided with a shaft 17, bearing 18, cross-piece 19, agitator blades 21, and baffles 22 and 23, similar to the correspondingly designated parts heretofore described in connection with the container 10. The container 30 also merges at its lower end into the tubular wall 25 enclosing a second perforated conveyor 26 rotatably mounted in the bottom 27 and top 27' of the conveyor housing 25. The holder 30 contains the wash water supplied through the intake 31 at the bottom of the container. 32 is a water overflow pipe and 33 an overflow line. A valved drain 36 and vent 37 are provided at the bottom and top, respectively, of the holder 30. Manholes 38 are located in the side walls of the container 10 and holder 30. The shaft 17 and conveyor 26 may be actuated by any suitable source of power, the speed of the conveyor being predetermined and governed to the end that the material in the holder 10 shall receive its intended treatment for the time required.

For example, in treating soya beans, I prefer to soak the beans in an $SO_2$ solution for eight hours and then wash the treated beans in fresh water for about ten hours. Therefore, the height of the container 10 and the speed of rotation of the conveyor 26 associated with said container 10 are correlated so that (the cycle of operation having been initiated) the beans will be immersed in the solution for the required time as they gradually move downwardly in the container 10 and also while they are moved upwardly in the conveyor until they reach the fluid line 34. From the conveyor the treated beans are carried to the wash water holder 30, in which they gradually move downwardly during the predetermined time, meeting in counter-current the freshest water at the bottom of the holder 30.

The conveyor associated with the holder 30 carries the washed beans upwardly to any suitable dryer. 35 indicates the high water line in the wash water holder 30 and its conveyor housing 25.

The $SO_2$ solution inlet 14 insures an adequate supply of the treatment fluid to the untreated beans at the beginning of the treatment of the incoming beans when they most readily absorb the solution and the inlets 15 and 16 supplement the supply of fresh solution when needed. The wash water, supplied at the bottom of the holder 30, insures efficient washing of the beans in the freshest water, after they have gradually moved downwardly through the upflowing wash water in the holder 30.

While I have described the apparatus of my invention as particularly adapted for the treatment of soya beans in a solution of $SO_2$ and subsequent washing of the beans, it is to be understood that the materials to be treated, as well as the treating agents, may be varied without departing from my invention. In the claims I identify the container 10 as the receiving container and the container 30 as a wash water holder, but it is to be understood that these are terms of description and not of limitation for obviously different materials and treating agents may be placed in the receiving container, and an agent other than water may be used in the holder 30 for the subsequent treatment of the material carried from the container 10 to the container 30.

Changes may be made in details of construction without departing from the scope of my invention and I do not intend to be limited to the exact form shown and described, except as set forth in the appended claims.

I claim:—

1. Apparatus for continuous treatment of soya beans and the like comprising a plurality of similar vertically-disposed closed containers, a conveyor and conveyor housing extending from the lower end of the first container to the upper end of an adjacent container to remove the beans from the liquid in the first container adjacent the bottom thereof, said first container having means for receiving the beans and a treating agent through its upper end, and said conveyor being operated at a predetermined speed correlated to the distance travelled by the beans through the treating agent, whereby the beans being treated will gradually move downwardly under the influence of gravity through said first container and remain therein and in the conveyor housing a predetermined period of time.

2. In an apparatus for the continuous treatment for a predetermined period by successive treating and washing agents of soya beans and the like, a closed treating chamber having means for receiving the soya beans and the treating agent at one end thereof, means for constantly agitating the beans in the treating agent, said means including a conveyor at the opposite end of the container for progressively advancing the beans under treatment through the treating agent in the container and for conveying the same to a distant point while being agitated and under the influence of the treating agent, said advancing means being operated at a predetermined speed correlated to the distance travelled by the beans through the treating agent whereby the beans will be treated for a predetermined time, a washing chamber at said aforementioned distant point, and an overflow spaced from said washing chamber communicating with the advancing means.

3. The structure of claim 1 in which the adjacent container has closed conveying means leading from the bottom thereof, means for supplying water at the junction of said last mentioned container and its conveying means, and means for maintaining a constant level in said adjacent chamber and its conveying means.

MICHELE BONOTTO.